(12) United States Patent
Lee et al.

(10) Patent No.: US 9,423,556 B2
(45) Date of Patent: Aug. 23, 2016

(54) OPTICAL ASSEMBLY, BACKLIGHT MODULE AND LIQUID CRYSTAL DISPLAY

(71) Applicant: Radiant Opto-Electronics Corporation, Kaohsiung (TW)

(72) Inventors: Yu-Ju Lee, Kaohsiung (TW); Hsueh-Ju Chen, Kaohsiung (TW); Jian-Uei Chin, Kaohsiung (TW); Pei-Fen Hou, Kaohsiung (TW)

(73) Assignee: RADIANT OPTO-ELECTRONICS CORPORATION, Kaohsiung (TW)

( * ) Notice: Subject to any disclaimer, the term of this patent is extended or adjusted under 35 U.S.C. 154(b) by 187 days.

(21) Appl. No.: 14/475,591

(22) Filed: Sep. 3, 2014

(65) Prior Publication Data

US 2015/0285989 A1 Oct. 8, 2015

(30) Foreign Application Priority Data

Apr. 7, 2014 (TW) .............................. 103112727 A

(51) Int. Cl.
*G02F 1/1333* (2006.01)
*F21V 8/00* (2006.01)

(52) U.S. Cl.
CPC ........ *G02B 6/0088* (2013.01); *G02F 1/133308* (2013.01); *G02F 2001/133317* (2013.01); *G02F 2001/133322* (2013.01)

(58) Field of Classification Search
CPC .................................................. G02F 1/133308
See application file for complete search history.

(56) References Cited

U.S. PATENT DOCUMENTS

| 8,958,023 B2* | 2/2015 | Fukuda | G02F 1/133308 349/58 |
| 9,301,389 B2* | 3/2016 | Yeo | H05K 1/0281 |
| 2007/0241991 A1* | 10/2007 | Tsai | G02F 1/133308 345/7 |
| 2009/0303408 A1* | 12/2009 | Huang | G02F 1/133308 349/58 |
| 2010/0149451 A1* | 6/2010 | Tanaka | G02F 1/133308 349/58 |
| 2010/0208494 A1 | 8/2010 | Kuo et al. | |

FOREIGN PATENT DOCUMENTS

| CN | 1584702 A | 2/2005 |
| CN | 1677186 A | 10/2005 |
| CN | 102980114 A | 3/2013 |
| CN | 203552627 U | 4/2014 |
| JP | 2002250915 A | 9/2002 |
| TW | 200525232 A | 8/2005 |
| TW | 200727034 A | 7/2007 |

* cited by examiner

Primary Examiner — Timothy L Rude
(74) Attorney, Agent, or Firm — CKC & Partners Co., Ltd.

(57) ABSTRACT

An optical assembly, a backlight module and a liquid crystal display are provided. The optical assembly includes a light guide plate and a frame. The light guide plate has at least one first circular-arc structure disposed on a side of the light guide plate. The frame is disposed around the light guide plate, in which the frame has at least one second circular-arc structure interlocked with the first circular-arc structure. A radius of the first circular-arc structure is substantially equal to a radius of the second circular-arc structure.

20 Claims, 12 Drawing Sheets

OPTICAL ASSEMBLY, BACKLIGHT MODULE AND LIQUID CRYSTAL DISPLAY

RELATED APPLICATIONS

This application claims priority to Taiwan Application Serial Number 103112727, filed Apr. 7, 2014, which is herein incorporated by reference.

BACKGROUND

1. Field of invention

The present invention relates to a light source assembly. More particularly, the present invention relates to an optical assembly, a backlight module and a liquid crystal display.

2. Description of Related Art

Referring to FIG. 1, FIG. 1 is a schematic structural diagram showing a conventional light guide plate 100 disposed on a frame 120. The conventional light guide plate 100 includes two rectangular flange lugs 101 respectively disposed on two sides of the light guide plate 100, and the frame 120 includes two recesses 121 corresponding to the flange lugs 101. Therefore, the light guide plate 100 can be positioned in the frame 120 by inserting the flange lugs 101 into the recesses 121. As shown in FIG. 1, in order to prevent the flange lugs 101 from being broken caused by impacting the frame 120, cushions 140 are generally installed on the two sides of the flange lugs 101 and adhered in the recesses 121 of the frame 120 by an adhesive 142 to increase the stability of the light guide plate 100.

However, the process for assembling the light guide plate 100 with the frame 120 is relatively difficult and time-consuming, thus causing high manpower cost and rework cost. In addition, because the thickness of the light guide plate 100 itself is very thin, the contact surfaces between the cushions 140 and the frame 120 are limited. The adhesive force of the cushions will be decreased. Accordingly, when the frame 120 and the light guide plate 100 bear on relatively big shake and impact, the cushions 140 will not keep its efficacy effectively and maybe fallen off due to lower adhesive force.

SUMMARY

One object of the present invention is to provide an optical assembly, a backlight module and a liquid crystal display, in which two circular-arc structures having corresponding shapes with substantially equal radius can be interlocked together to position the light guide plate in the frame. Therefore, external force exerted on the circular-arc structures can be decreased without needing to use the conventional cushions, thus preventing the circular-arc structures from being damaged and the light guide plate from displacing the frame. Moreover, the omission of the cushions can reduce the assembling cost and time.

Another object of the present invention is to provide an optical assembly, a backlight module and a liquid crystal display, in which there are gaps between the corresponding two circular-arc structures. When the light guide plate is expanded by heat and moisture absorption, the gaps provide tolerance for allowing the circular-arc structures to expand therein, so as to prevent the light guide plate from being deformed. In addition, because the corresponding two circular-arc structures have substantially equal radius, while the light guide plate expands, the corresponding two circular-arc structures can be self-aligned with each other.

According to the aforementioned objects, an optical assembly is provided.

The optical assembly includes a light guide plate and a frame. The light guide plate has at least one first circular-arc structure disposed on a side of the light guide plate. The frame is disposed around the light guide plate, in which the frame has at least one second circular-arc structure interlocked with the first circular-arc structure. A radius of the first circular-arc structure is substantially equal to a radius of the second circular-arc structure.

According to an embodiment of the present invention, a connecting line between a center of the first circular-arc structure and a center of the second circular-arc structure is substantially vertical to the side of the light guide plate.

According to an embodiment of the present invention, the light guide plate has a first axial direction and a second axial direction, and a center of the first circular-arc structure and a center of the second circular-arc structure are located on an axis substantially parallel to the first axial direction.

According to an embodiment of the present invention, there are a first gap and a second gap between the first circular-arc structure and the second circular-arc structure, and the first gap is a distance from any point of the first circular-arc structure to the second circular-arc structure along a direction substantially parallel to the first axial direction, and the second gap is the shortest distance from any point on the first circular-arc structure to the second circular-arc structure along a direction substantially parallel to the second axial direction, in which the first gap is greater than the second gap.

According to an embodiment of the present invention, the frame further includes a surface and a sidewall connected to the surface, the light guide plate is deposed on the surface and the second circular-arc structure is disposed on the sidewall.

According to an embodiment of the present invention, the first circular-arc structure is a flange lug, and the second circular-arc structure is a recess portion.

According to an embodiment of the present invention, the frame is a U-shaped structure and includes an opening.

According to an embodiment of the present invention, the first circular-arc structure and the second circular-arc structure are disposed adjacent to the opening.

According to the aforementioned objects, a backlight module is provided. The backlight module includes the aforementioned optical assembly and a light source. The light source is disposed on a side of the light guide plate.

According to an embodiment of the present invention, a connecting line between a center of the first circular-arc structure and a center of the second circular-arc structure is substantially vertical to the side of the light guide plat According to an embodiment of the present invention, the light guide plate has a first axial direction and a second axial direction, and a center of the first circular-arc structure and a center of the second circular-arc structure are located on an axis substantially parallel to the first axial direction.

According to an embodiment of the present invention there are a first gap and a second gap between the first circular-arc structure and the second circular-arc structure, and the first gap is a distance from any point on the first circular-arc structure to the second circular-arc structure along a direction substantially parallel to the first axial direction, and the second gap is the shortest distance from any point on the first circular-arc structure to the second circular-arc structure along a direction substantially parallel to the second axial direction, and the first gap is greater than the second gap.

According to an embodiment of the present invention, the frame further includes a surface and a sidewall connected to the surface, the light guide plate is deposed on the surface and the second circular-arc structure is disposed on the sidewall.

According to an embodiment of the present invention, the first circular-arc structure is a flange lug, and the second circular-arc structure is a recess portion.

According to an embodiment of the present invention, the frame is a U-shaped structure and includes an opening.

According to an embodiment of the present invention, the first circular-arc structure and the second circular-arc structure are disposed adjacent to the opening.

According to an embodiment of the present invention, the light source is disposed in the opening of the frame.

According to an embodiment of the present invention, the light source is disposed in the opening of the frame.

According to the aforementioned objects, a liquid crystal display is provided. The liquid crystal display includes the aforementioned optical assembly, a light source and a liquid crystal panel. The light source is disposed on a side of the light guide plate. The liquid crystal panel is disposed on the frame of the optical assembly.

According to an embodiment of the present invention, a connecting line between a center f the first circular-arc structure and a center of the second circular-arc structure is substantially vertical to the side of the light guide plate.

It is to be understood that both the foregoing general description and the following detailed description are by examples,, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
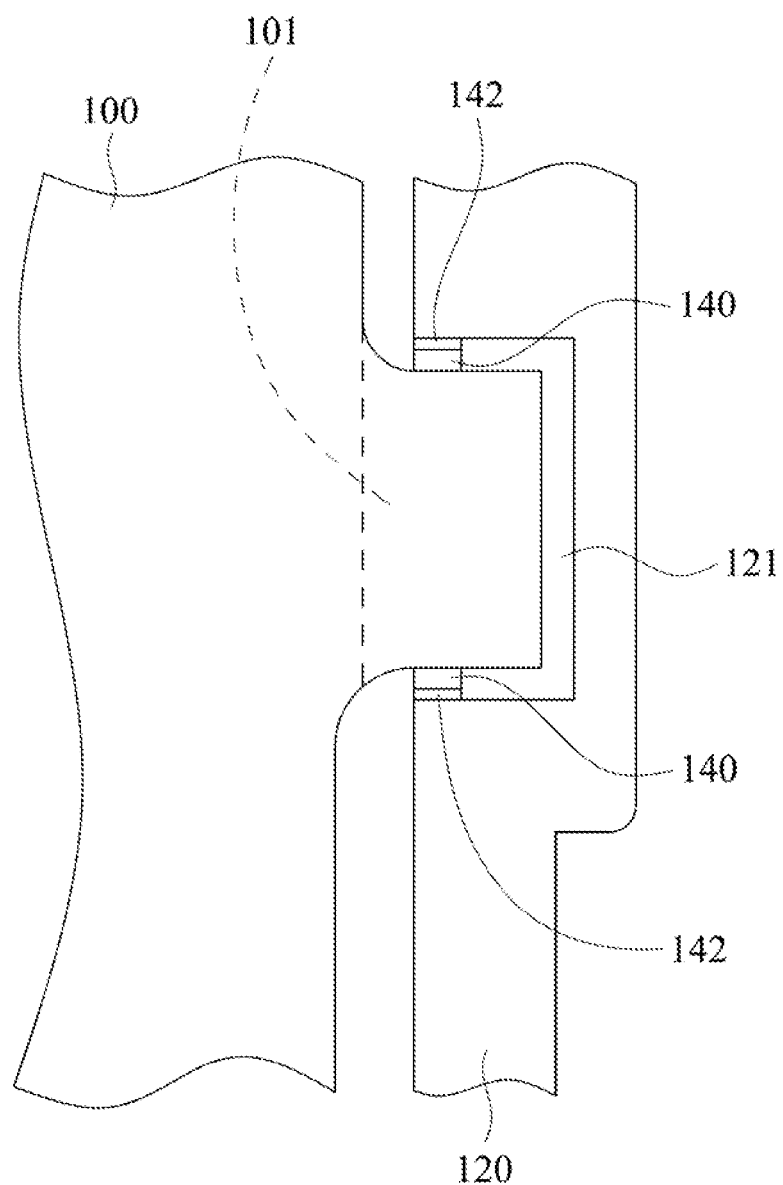
FIG. 1 is a schematic structural diagram showing a conventional light guide plate disposed on a frame

Reference will now be made in detail to the present embodiments of the invention, examples of which are illustrated in the accompanying drawings. Wherever possible, the same reference numbers are used in the drawings and the description to refer to the same or like parts.

Figure 2:
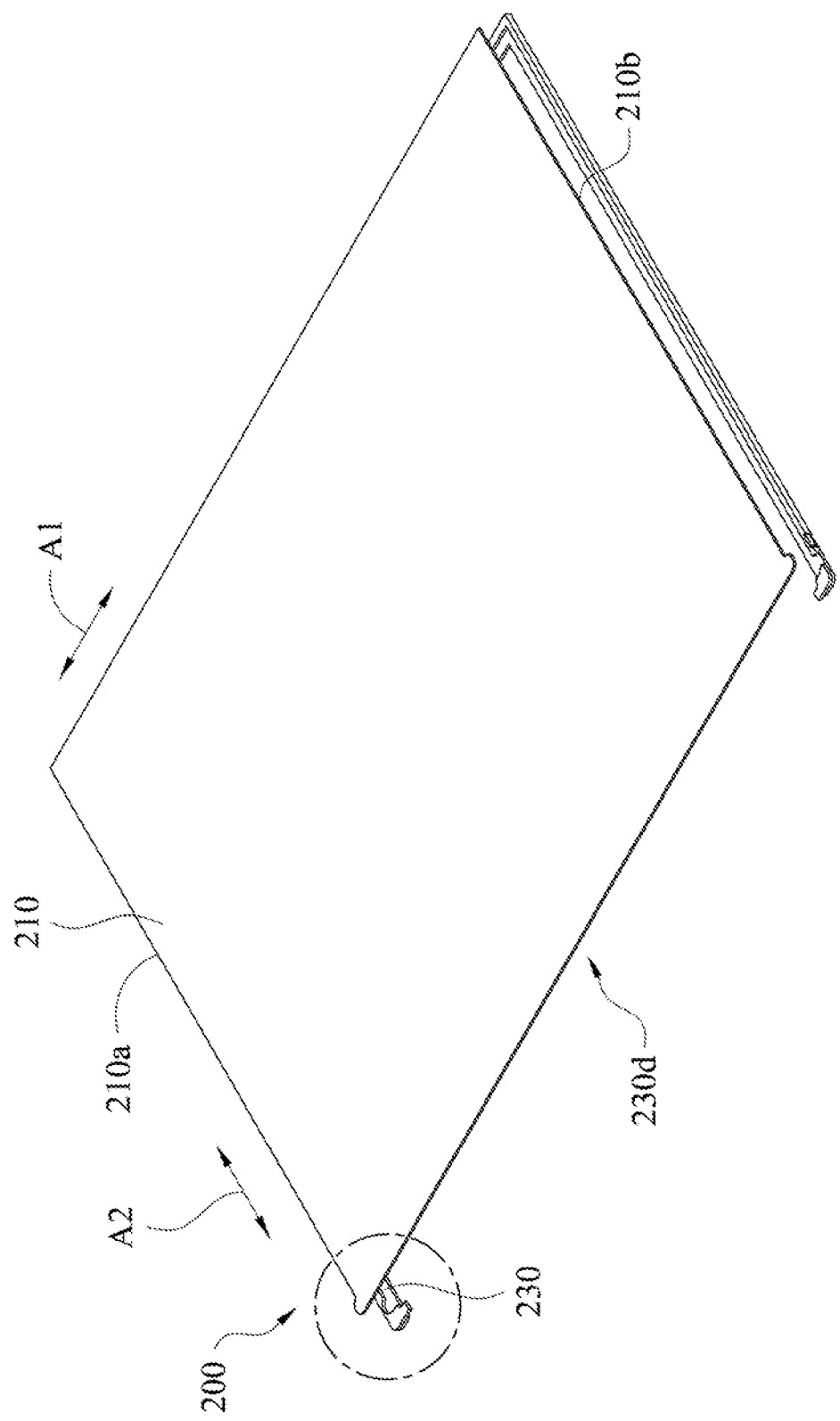
FIG. 2 is a schematic exploded view showing an optical assembly in accordance with a first embodiment of the present invention.
Figure 3:
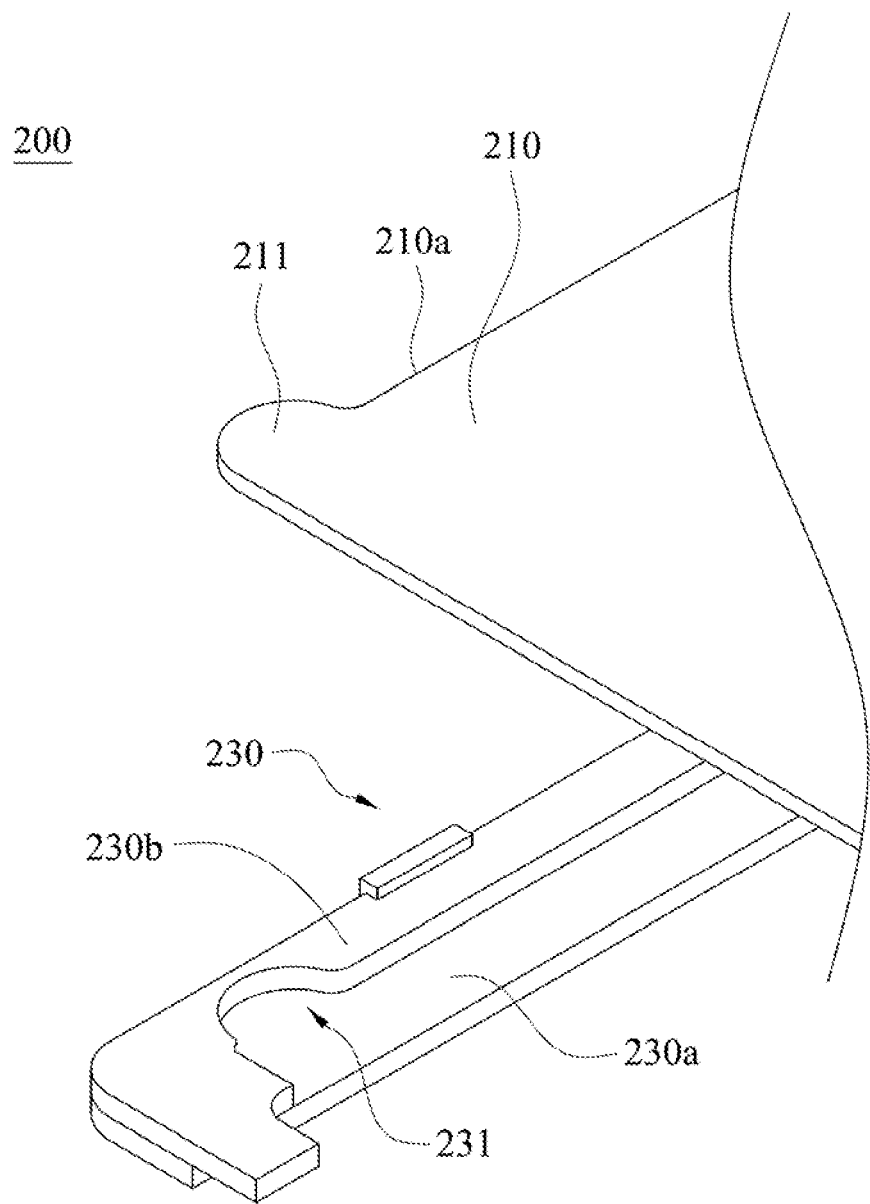
FIG. 3 is a partial structural diagram showing the optical assembly in accordance with the first embodiment of the present invention.

Referring to FIG. 2 and FIG. 3, FIG. 2 and FIG. 3 are a schematic exploded view and a partial structural diagram showing an optical assembly 200 in accordance with a first embodiment of the present invention. The optical assembly 200 in the present embodiment can be applied to a light source module, a backlight module or a liquid crystal display. The optical assembly 200 mainly includes a light guide plate 210 and a frame 230. The light guide plate 210 can guide light entering from a light-incident surface to a light-emitting surface. Sides of the light guide plate 210, such as sides 210a and 210b, are implemented with at least one first circular-arc structure 211. As shown in FIG. 2, in one embodiment, the light guide plate 210 has a first axial direction A1 and a second axial direction A2, in which the "first axial direction A1" refers to a direction substantially vertical to the sides 210a and 210b of the light guide plate 210, and the "second axial direction A2" refers to a direction substantially parallel to the sides 210a and 210b of the light guide plate 210. It is noted that the sides 210a and 210b refer to short edges of the light guide plate 210.

The frame 230 is disposed around the light guide plate 210, and a portion of the light guide plate 210 is disposed in the frame 230. In addition, the frame 230 is implemented with at least one second circular-arc structure 231 corresponding to the first circular-arc structure 211. When the frame 230 is combined with the light guide plate 210, the light guide plate 210 can be positioned in the frame 230 by interlocking the first circular-arc structure 211 with the second circular-arc structure 231. It is noted that when the optical assembly 200 is being assembled, the frame 230 is disposed above the light guide plate 210. As shown in some figures, to illustrate the light guide plate 210 on the frame 230 is merely used for clarifying the locations of the respective components of the present embodiment, and does not intend to limit the present invention.

Referring to FIG. 2 and FIG. 3 again, in the present embodiment, the light guide plate 210 has two first circular-arc structures 211 respectively disposed on the opposite sides 210a and 210b. On the other hand, the frame 230 has two second circular-arc structures 231 respectively corresponding to the two first circular-arc structures 211 of the light guide plate 210. In the present embodiment, the first circular-arc structures>211 are flange lugs respectively extending from the sides 210a and 21 Ob of the light guide plate 210, and the second circular-arc structures 231 are recess portions corresponding to the flange lugs. As shown in FIG. 2, the frame 230 is a U-shaped structure and includes an opening 230d. When the optical assembly 200 is applied to the backlight module, the opening 230d can be used to dispose a light source. In one example, the first circular-arc structures 211 and the second circular-arc structures 231 are disposed adjacent to the opening 230d.

Figure 4:
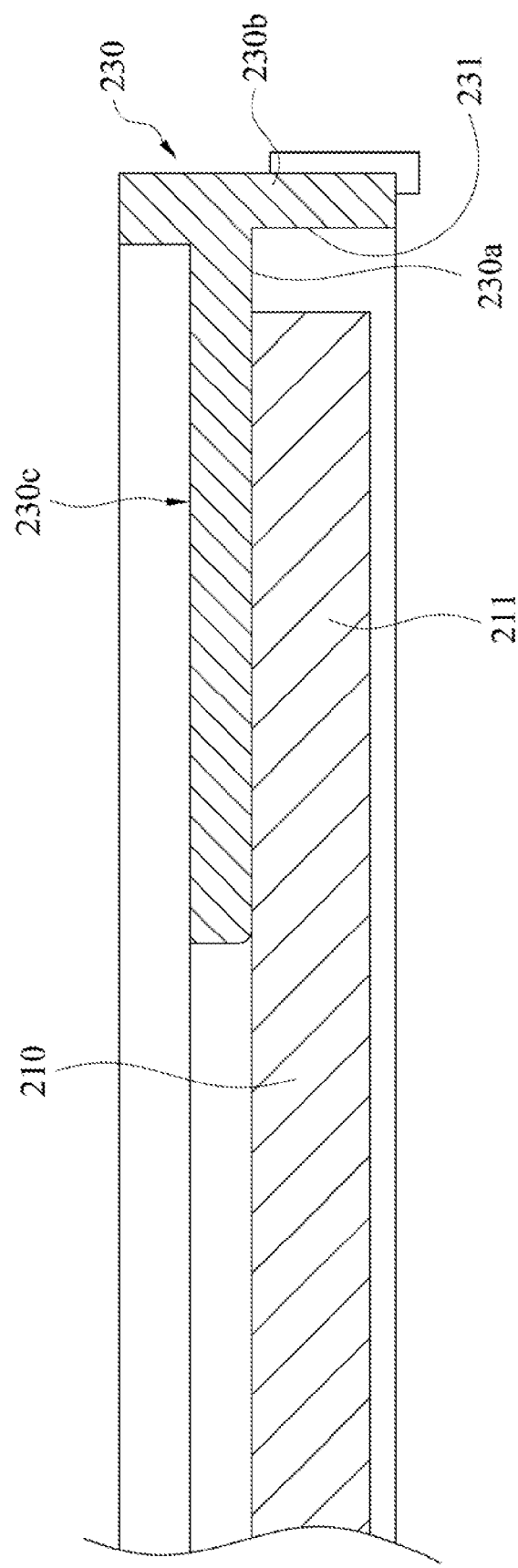
FIG. 4 is a schematic cross-sectional view of the optical assembly in accordance with the first embodiment of the present invention.

Simultaneously referring to FIG. 4, FIG. 4 is a schematic cross-sectional view of the optical assembly 200 in accordance with the first embodiment of the present invention. In one embodiment, the cross-sectional profile of the frame 230 is inverted T-shaped, and the frame 230 has a surface 230a and a sidewall 230b substantially vertical to the surface 230a. The second circular-arc structure 231 is disposed on the sidewall 230b and connected to the surface 230a. Therefore, when the frame 230 is disposed on the light guide plate 210, the surface 230a of the frame 230 contacts and fixes the light guide plate 210. As shown in FIG. 4, in one embodiment, the frame 230 has a carrying surface 230c, and the carrying surface 230c and the surface 230a are respectively located on the two opposite sides of the frame 230. When the optical assembly 200 is applied to the liquid crystal display, the carrying surface 230c is used to dispose a liquid crystal panel.

Figure 5:
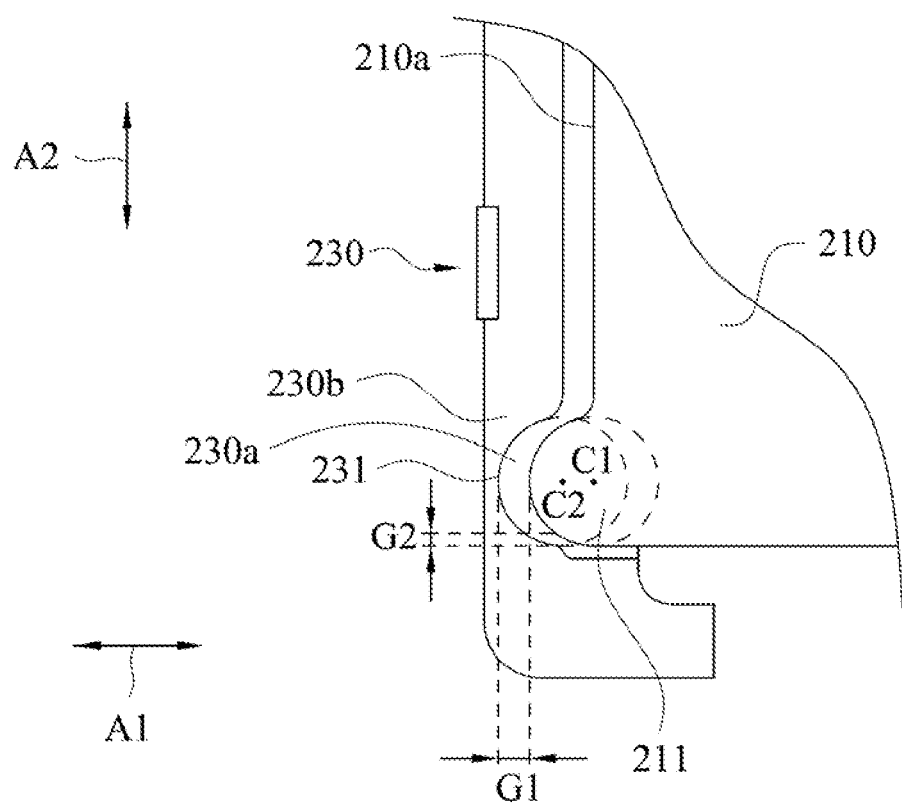
FIG. 5 is a schematic top view of the optical assembly in accordance with the first embodiment of the present invention.

Simultaneously referring to FIG. 3 and FIG. 5, FIG. 5 is a schematic top view of the optical assembly 200 in accordance with the first embodiment of the present invention. In the present embodiment, a radius of the first circular-arc structure 211 is substantially equal to a radius of the second circular-arc structure 231. In other words, the first circular-arc structure 211 and the second circular-arc structure 231 have the same dimension and corresponding shape. Moreover, a connecting line between a center C1 of the first circular-arc structure 211 and a center C2 of the second circular-arc structure 231 is substantially vertical to the sides 210a and 210b of the light guide plate 210. In other words, the center C1 of the first circular-arc structure 211 and the center C2 of the second circular-arc structure 231 are located on an axis substantially parallel to the first axial direction A1. Therefore, the first circular-arc structure 211 and the second circular-arc structure 231 are in contact with each other, the contact surfaces between the first circular-arc structure 211 and the second circular-arc structure 231 are tangent to each other.

Figure 6A:
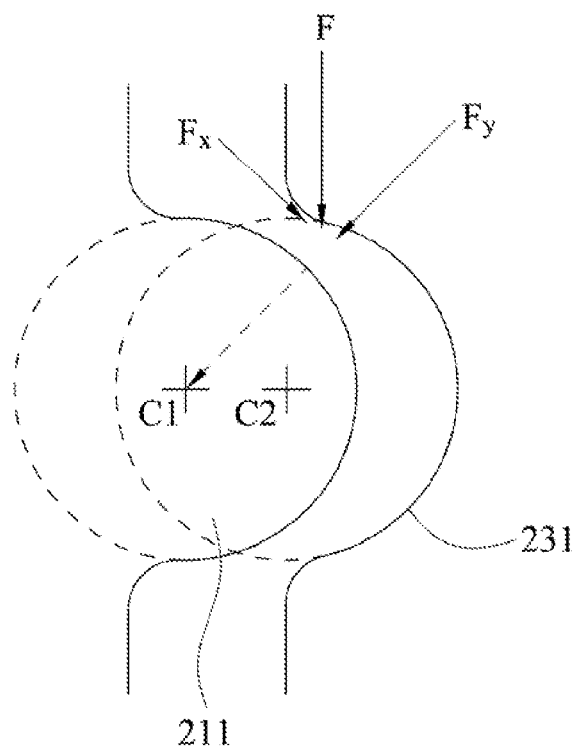
FIG. 6A is a schematic structural diagram showing the optical assembly impacted by an external force.

Simultaneously referring to FIG. 6A, FIG. 6A is a schematic structural diagram showing the optical assembly impacted by an external force. When the frame 230 and the light guide plate 210 are impacted by an external force F, a component force $F_y$ of the external force F is directed to the center C1 and is considered as an invalid force. Therefore, the frame 230 and the light guide plate 210 merely receive the component force $F_x$ of the external force F, so as to decrease the external force F exerted on the first circular-arc structure 211 In other words, the two tangent circular-arc structures can be used to decrease the external force exerted on the light guide plate 210 without installing the conventional cushion.

Referring to FIG. 3 and FIG again, when the frame 230 is combined with the light guide plate 210, there are a first gap G1 and a second gap G2 between the first circular-arc structure 211 and the second circular-arc structure 231. The first gap GI and the second gap G2 provide tolerance for allowing the first circular-arc structure 211 to expand therein, so as to prevent the light guide plate 210 from being deformed The aforementioned "first gap G1" is a distance from any point on the first circular-arc structure 211 to the second circular-arc structure 231 along a direction substantially parallel to the first axial direction A1. As shown in FIG. 5, the first circular-arc structure 211 and the second circular-arc structure 231 are eccentric, so that the first gap G1 can allow the first circular-arc structure 211 to expand due to the heat or moisture absorption. On the other hand, the aforementioned "second gap G2" is a distance from any point on the first circular-arc structure 211 to the second circular-arc structure 231 along a direction substantially parallel to the second axial direction A2. one embodiment, the second gap G2 can be designed according to different requirements. In other embodiments, the second gap G2 is the shortest distance from any point on the first circular-arc structure 211 to the second circular-arc structure 231 along the direction substantially parallel to the second axial direction A2. it is noted that the second gap G2 shown in FIG. 5 is not the short distance and is used as an example for explanation in the present embodiment, and the present invention is not limited thereto.

Simultaneously referring to FIG. 2, FIG. 3 and FIG. 5, Although the expansion ratios along the first axial direction A1 and along the second axial direction A2 are the same, yet because the dimension of a long edge of the light guide plate 210 is greater than the dimension of a short edge, so that the expansion volume of the long edge of the light guide plate 210 is greater than the expansion volume of the short edge when the light guide plate 210 is expanded by heat or moisture absorption. Because the first circular-arc structures 211 are extending along the first axial direction A1 from the side 210a and the side 210b, when the light guide plate 210 expands, the first circular-arc structures 211 expand accordingly. As shown in FIG. 2, the first axial direction A1 is parallel to the long edge of the light guide plate 210, and the second axial direction A2 is parallel to the short edge of the light guide plate 210, so that the expansion volume of the first circular-arc structure 211 along the first axial direction A1 is greater than that along the second axial direction A2. Therefore, the dimension of the first gap G1 has to be greater than the dimension of the second gap G2. In addition, the second gap G2 is small enough to allow the light guide plate 210 to be positioned within the frame 230 or in an affordable tolerance range so as to maintain optical stability of the optical assembly 200. It is noted that the first gap G1 and the second gap G2 are not only designed according to the expansion volume of the light guide plate 210, but also according to the materials of the frame 230.

Figure 6B:
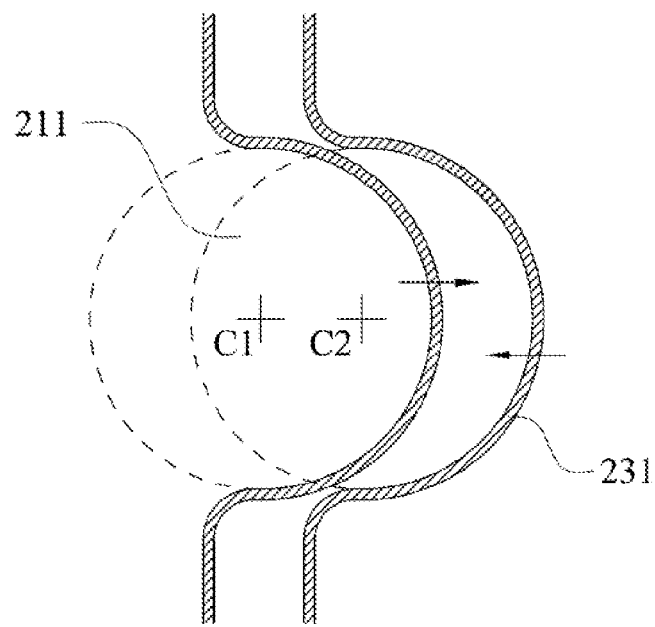
FIG. 6B is a schematic structural diagram showing the optical assembly expanded by heat and moisture absorption.

Simultaneously referring to FIG. 6B, FIG. 6B is a schematic structural diagram showing the optical assembly 200 expanded by heat and moisture absorption. As shown in FIG. 66, the inclined line area near the edges of the first circular-arc structure 211 and second circular-arc structure 231 is an expansion area. Moreover, expansion volumes of the first circular-arc structure 211 and the second circular-arc structure 231 are different due to different materials of the light guide plate 210 and the frame 230. Because the radius of the first circular-arc structure 211 is substantially equal to the radius of the second circular-arc structure 231, when the first circular-arc structure 211 expands towards the frame 230 and the second circular-arc structure 231 expands towards the light guide plate 210, the light guide plate 210 and the frame 230 can be self-aligned with each other. In some conditions, after the first circular-arc structure 211 and the second circular-arc structure 231 expand, an adequacy gap has to be reserved between the first circular-arc structure 211 and the second circular-arc structure 231 to prevent the light guide plate 210 from being deformed resulting from the expansion by heat and moisture.

Figure 7:
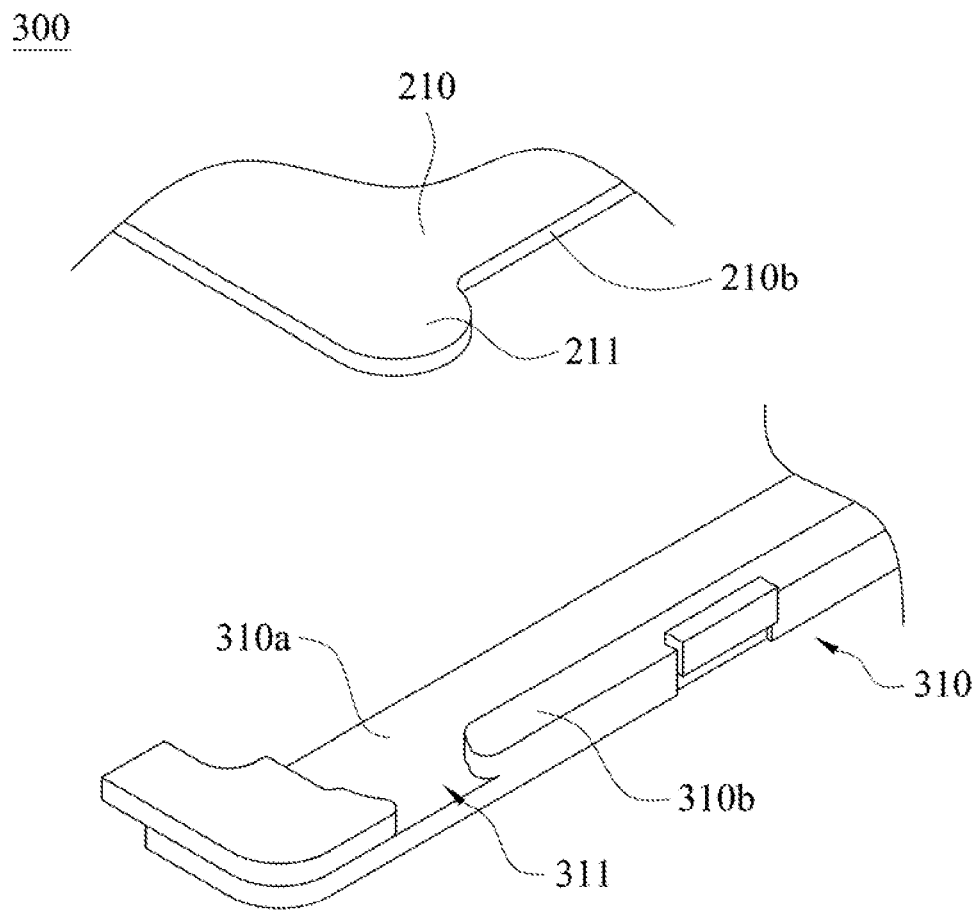
FIG. 7 is a partial structural diagram showing an optical assembly in accordance with a second embodiment of the present invention.
Figure 8:
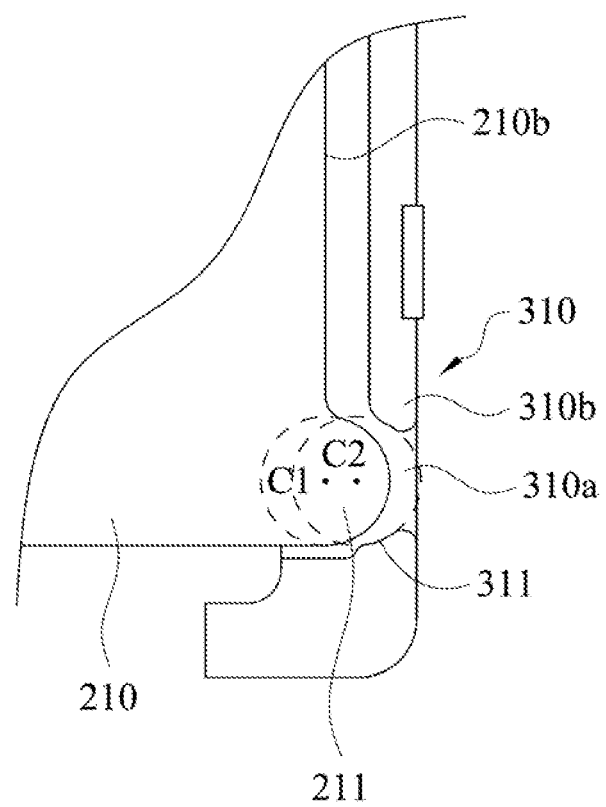
FIG. 8 is a schematic top view of the optical assembly in accordance with the second embodiment of the present invention.

In the present invention, the optical assembly 200 has different designs. As shown in FIG. 7 and FIG. 8, FIG. 7 and FIG. 8 are a partial structural diagram and a schematic top view showing an optical assembly 300 in accordance with a second embodiment of the present invention. In the present embodiment, the optical assembly 300 is similar to the aforementioned optical assembly 200 and the main difference therebetween is that a frame 310 of the optical assembly 300 has different structural design.

Referring to FIG. 7 and FIG. 8 again, the frame 310 of the present embodiment has a surface 310a and a sidewall 310b substantially vertical to the surface 310a. A second circular-arc structure 311 is an open structure and disposed on the sidewall 310b. Therefore, the width of the frame 310 can be decreased by disposing the second circular-arc structure 311, such that the open structure is suitable for use in the structural design of narrow frame 310. Similarly, the second circular-arc structure 311 is corresponding to the first circular-arc structure 211 of the light guide plate 210. Moreover, the radius of the first circular-arc structure 211 is substantially equal to the radius of the second circular-arc structure 311. Meanwhile a connecting line between the center C1 of the first circular-arc structure 211 and the center C2 of the second circular-arc structure 311 is substantially vertical to the side 210b of the light guide plate 210 so that the external force exerted on the first circular-arc structure 211 can be decreased.

Figure 9:
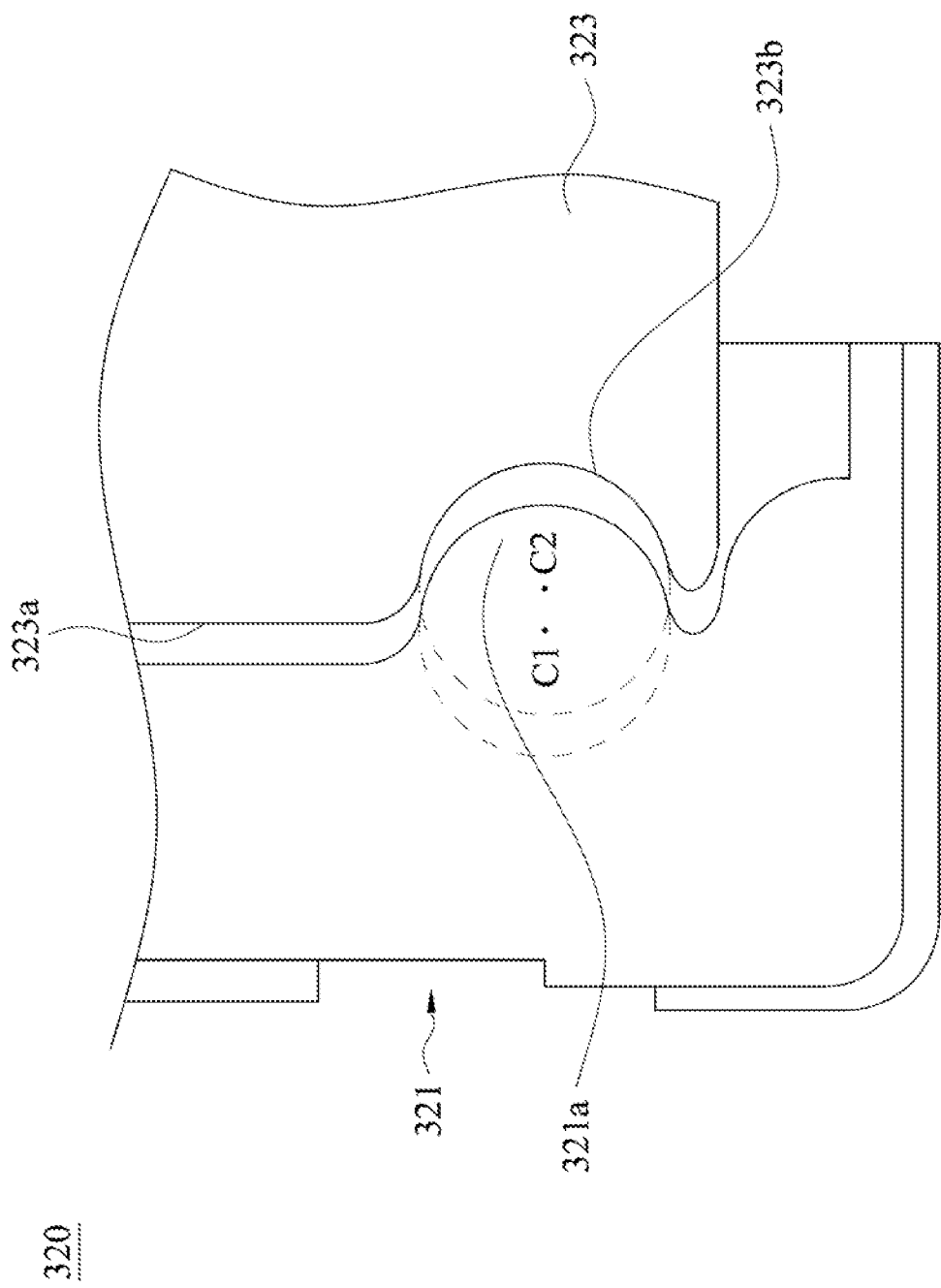
FIG. 9 is a schematic top view of an optical assembly in accordance with a third embodiment of the present invention.

In other embodiments, the optical assembly 200 has different designs. Referring to FIG. 9, FIG. 9 is a schematic top view of an optical assembly 320 in accordance with a third embodiment of the present invention. In the present embodiment, the optical assembly 320 is similar to the aforementioned optical assembly 200 and the main difference therebetween is that a frame 321 and a light guide plate 323 of the optical assembly 320 have different structural designs. It is noted that, in the embodiments shown in FIG. 1-FIG. 6, the first circular-arc structures 211 are flange lugs extending from the sides 210a and 210b, and the second circular-arc structures 231 are recess portions corresponding to the flange lugs. However, in the embodiment of FIG. 9, a first circular-arc structure 323b is a recess portion recessed from a side 323a of a light guide plate 323, and the second circular-arc structure 321a is a flange lug corresponding to the recess portion. Similarly, a connecting line between the center C1 of the first circular-arc structure 323b and the center C2 of the second circular-arc structure 321a is substantially vertical to the side 323a of the light guide plate 323, so that the external force exerted on the first circular-arc structure 211 can be decreased.

Figure 10:
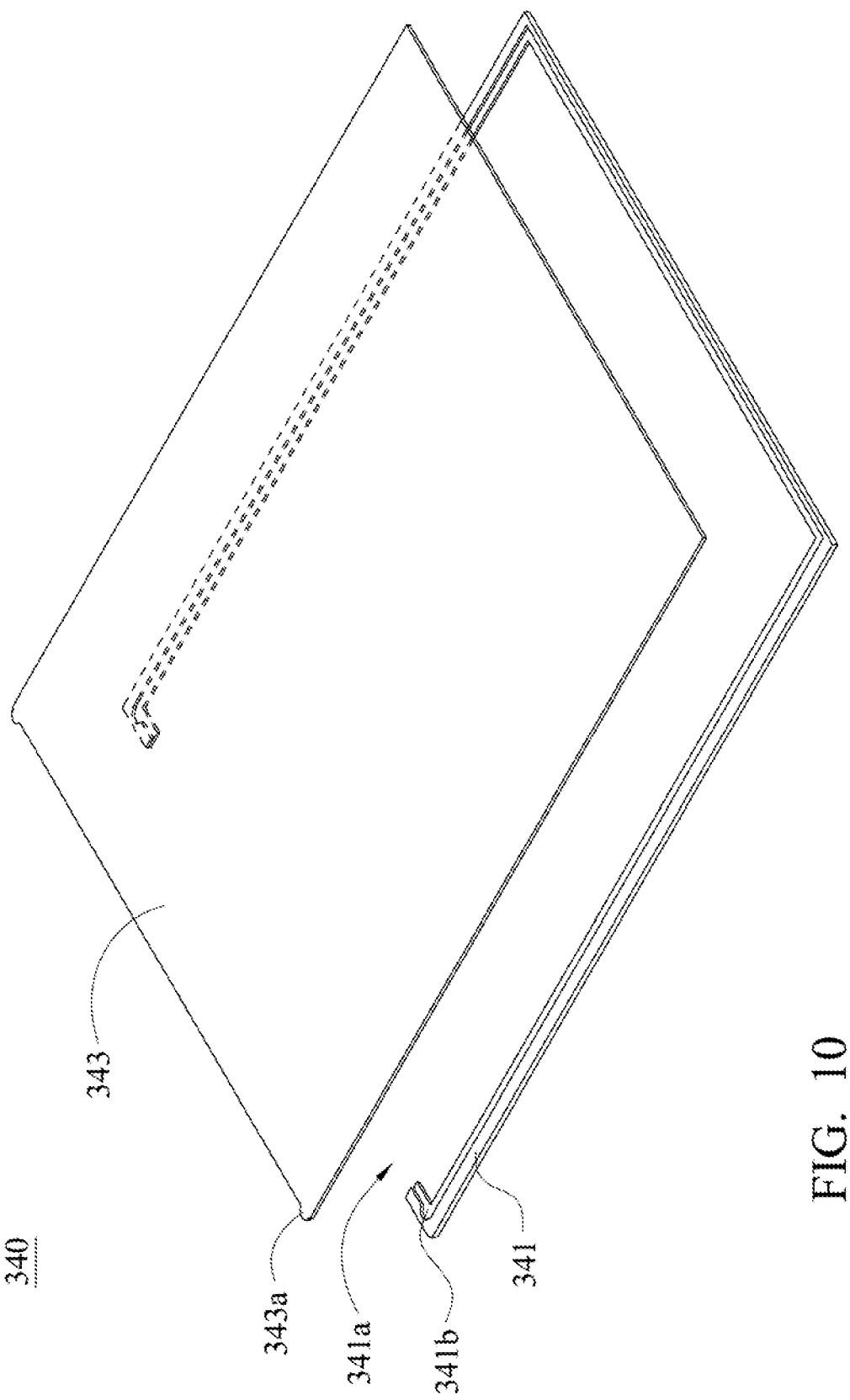
FIG. 10 is a schematic top view of an optical assembly in accordance with a fourth embodiment of the present invention.

In other embodiments, the optical assembly 200 has different designs. Referring to FIG. 10, FIG. 10 is a schematic top view of an optical assembly 340 in accordance with a fourth embodiment of the present invention. In the present embodiment, the optical assembly 340 is similar to the aforementioned optical assembly 200 and the main difference therebetween is that a frame 341 and a light guide plate 343 of the optical assembly 340 have different structural designs, It is noted that, in the embodiments shown in FIG. 1-FIG. 6, the opening 230d of the frame 230 is disposed corresponding to the long edge of the light guide plate 210, and the first circular-arc structures 211 are respectively disposed on the two sides 210a and 210b. Moreover, the extending direction of the first circular-arc structures 211 and the second circular-arc structures 231 shown in FIG. 1-FIG. 6 is parallel to the opening 230d, However, in the embodiment of FIG. 10, an opening 341a of the frame 341 is disposed corresponding to the short edge of the light guide plate 343. Meanwhile, the extending direction of first circular-arc structures 343a and second circular-arc structures 341b is substantially vertical to the opening 341a, so as to decrease the external force exerted on the first circular-arc structure 343a.

Figure 11:
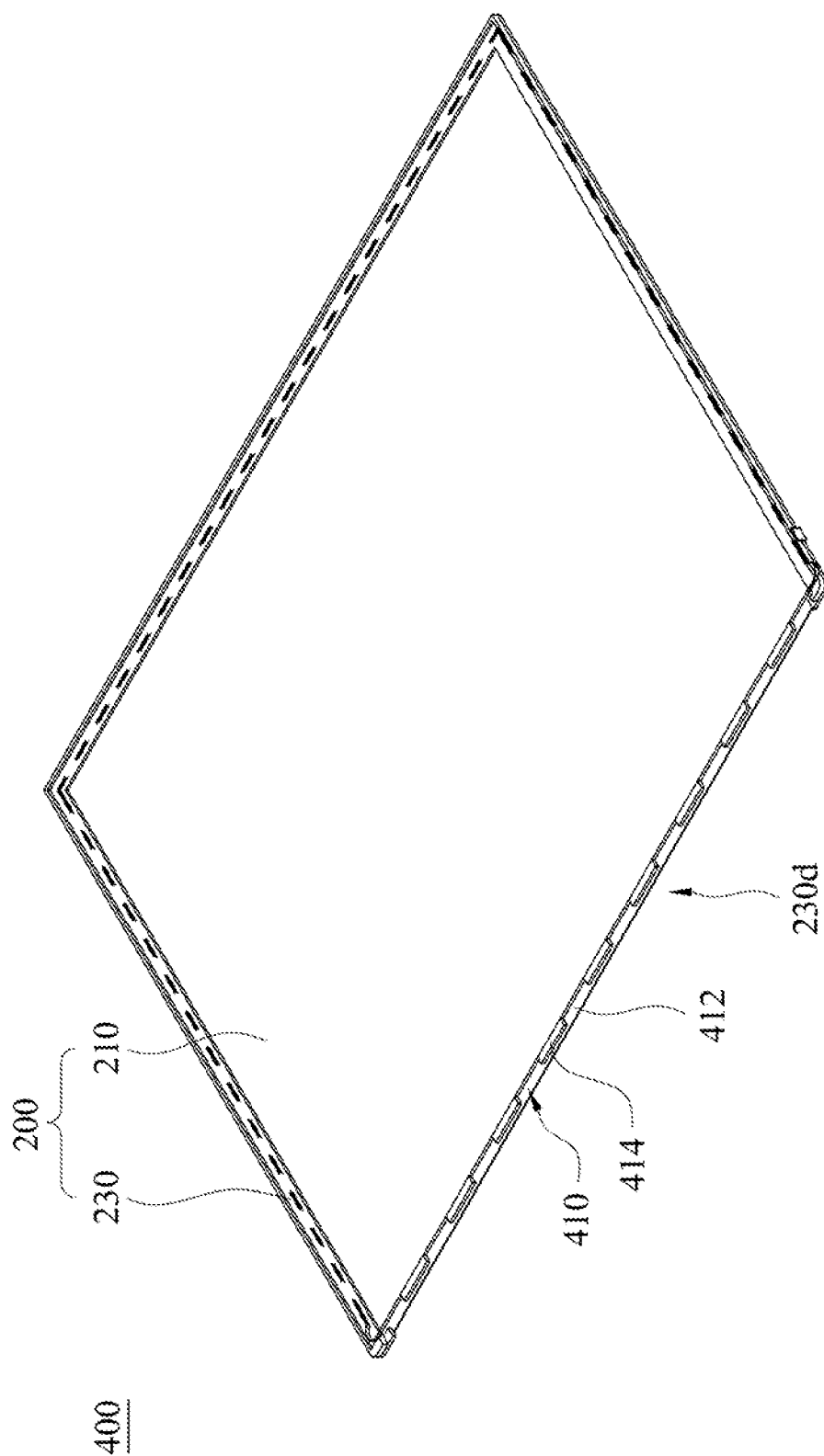
FIG. 11 is a schematic structural diagram showing a backlight module in accordance with an embodiment of the present invention.

Referring to FIG. 2, FIG. 3 and FIG. 11 FIG. 11 is a schematic structural diagram showing a backlight module 400 in accordance with an embodiment of the present invention. The backlight module 400 of the present embodiment includes the optical assembly 200 and a light source 410. The light source 410 is disposed on a side of the light guide plate 210 along the first axial direction Al and located in the opening 230d of the frame 230. In the present embodiment, the center C1 of the first circular-arc structure 211 and the center C2 of the second circular-arc structure 231 are located on an axis substantially parallel to the light source 410. As shown in FIG. 11, the light source 410 includes a circuit board 412 and plural light emitting diodes 414 disposed on the circuit board 412. In some embodiments, the light emitting diodes 414 directly contact the light guide plate 210 to enable light emitted from the light emitting diodes 414 to enter the light guide plate 210. However, in other embodiments, if the power and temperature of the light emitting diodes 414 are too high, the light emitting diodes 414 will be arranged to not to directly contact the light guide plate 210 and there is a distance between the light emitting diodes 414 and the light guide plate 210. In the backlight module 400 because the first circular-arc structure 211 of the light guide plate 210 and the second circular-arc structure 231 of the frame 230 can function to decrease the external force, when the backlight module 400 is impacted by an external force, the light guide plate 210 can be prevented from colliding the light source 410.

Figure 12:
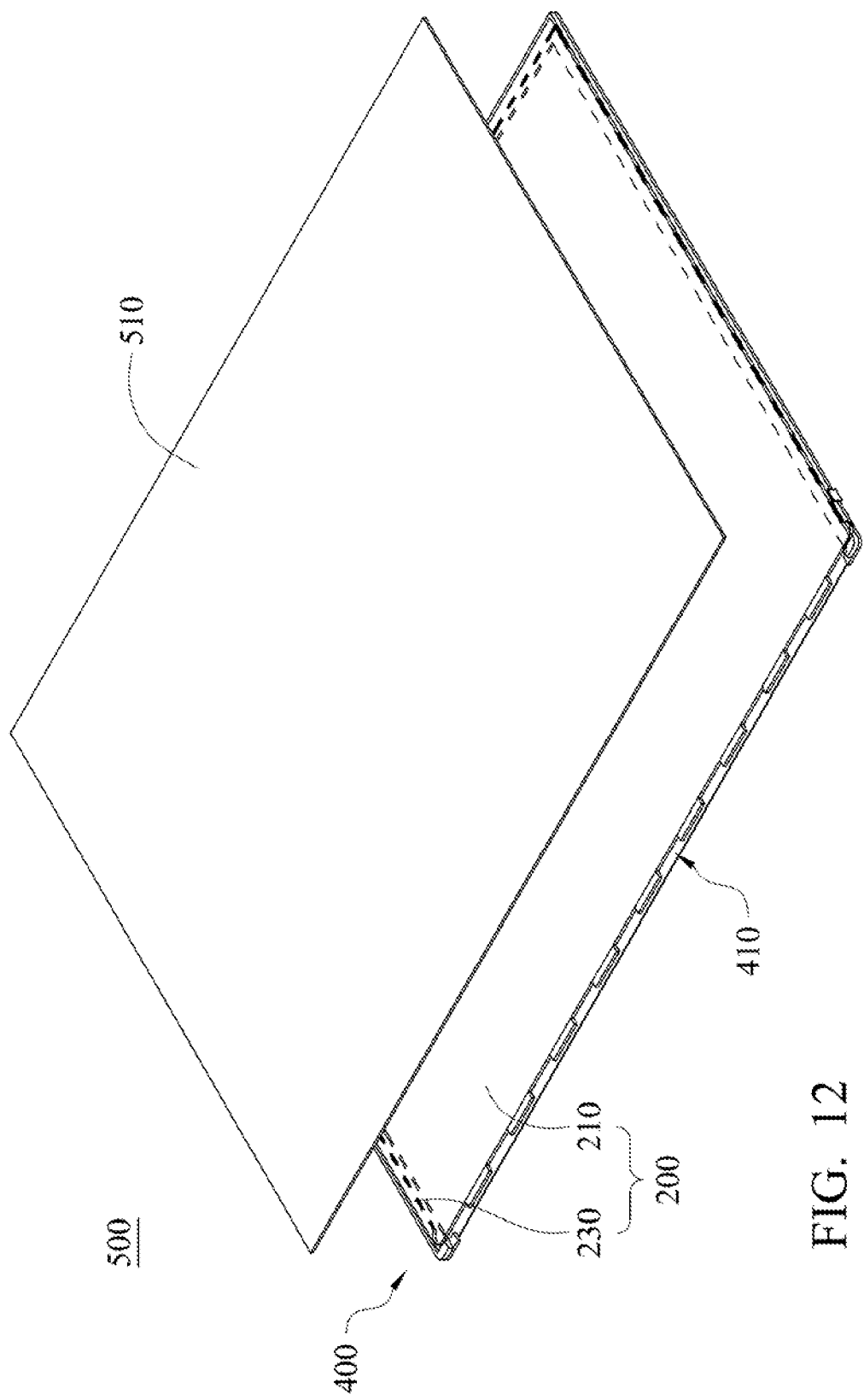
FIG. 12 is a structure-exploded diagram showing a light crystal display in accordance with an embodiment of the present invention.

Simultaneously referring to FIG. 3, FIG. 4 and FIG. 12, FIG. 12 is a structure-exploded diagram showing a light crystal display 500 in accordance with an embodiment of the present invention. The light crystal display 500 of the present embodiment includes the backlight module 400 and a liquid crystal panel 510. As shown in FIG. 4, the carrying surface 230c of the frame 230 is opposite to the surface 230a. Therefore, when the frame 230 is disposed on the light guide plate 210 and the surface 230a contacts the light guide plate 210, the liquid crystal panel 510 can be disposed on the carrying surface 230c.

According to the aforementioned embodiments of the present invention, two circular-arc structures having corresponding shapes with substantially equal radius can be interlocked together to position the light guide plate in the frame. Therefore, external force exerted on the circular-arc structures can be decreased without needing to use the conventional cushions, thus preventing the circular-arc structures from being damaged and the light guide plate from displacing the frame. Moreover, the omission of the cushions can reduce the assembling cost and time.

According to the aforementioned embodiments of the present invention, there are gaps between the corresponding two circular-arc structures. When the light guide plate is expanded by heat and moisture absorption, the gaps can allow the circular-arc structures to expand therein, so as to prevent the light guide plate from being deformed. In addition, because the corresponding two circular-arc structures have substantially equal radius, while the light guide plate expands, the corresponding two circular-arc structures can be self-aligned with each other.

Although the present invention has been described in considerable detail with reference to certain embodiments thereof, other embodiments are possible. Therefore, the spirit and scope of the appended claims should not be limited to the description of the embodiments contained herein, It will be apparent to those skilled in the art that various modifications and variations can be made to the structure of the present invention without departing from the scope or spirit of the invention, In view of the foregoing, it is intended that the present invention cover modifications and variations of this invention provided they fall within the scope of the following claims.

What is claimed is:
1. An optical assembly, comprising:
  a light guide plate having at least one first circular-arc structure disposed on a side of the light guide plate; and
  a frame disposed around the light guide plate, wherein the frame has at least one second circular-arc structure interlocked with the first circular-arc structure;

wherein a radius of the first circular-arc structure is substantially equal to a radius of the second circular-arc structure.

2. The optical assembly of claim 1, wherein a connecting line between a center of the first circular-arc structure and a center of the second circular-arc structure is substantially vertical to the side of the light guide plate.

3. The optical assembly of claim 2, wherein there are a first gap and a second gap between the first circular-arc structure and the second circular-arc structure, and the first gap is a distance from any point of the first circular-arc structure to the second circular-arc structure along a direction substantially parallel to the first axial direction, and the second gap is the shortest distance from any point on the first circular-arc structure to the second circular-arc structure along a direction substantially parallel to the second axial direction, wherein the first gap is greater than the second gap.

4. The optical assembly of claim 1, wherein the light guide plate has a first axial direction and a second axial direction, and a center of the first circular-arc structure and a center of the second circular-arc structure are located on an axis substantially parallel to the first axial direction.

5. The optical assembly of claim 1, wherein the frame further comprises a surface and a sidewall connected to the surface, the light guide plate is deposed on the surface and the second circular-arc structure is disposed on the sidewall.

6. The optical assembly of claim 1, wherein the first circular-arc structure is a flange lug, and the second circular-arc structure is a recess portion.

7. The optical assembly of claim 1, wherein the frame is a U-shaped structure and comprises an opening.

8. The optical assembly of claim 7, wherein the first circular-arc structure and the second circular-arc structure are disposed adjacent to the opening.

9. A backlight module, comprising:
an optical assembly as claimed in claim 1; and
a light source disposed on a side of the light guide plate.

10. The backlight module of claim 9, wherein a connecting line between a center of the first circular-arc structure and a center of the second circular-arc structure is substantially vertical to the side of the light guide plate.

11. The backlight module of claim 10, wherein there are a first gap and a second gap between the first circular-arc structure and the second circular arc structure, and the first gap is a distance from any point on the first circular arc structure to the second circular-arc structure along a direction substantially parallel to the first axial direction, and the second gap is the shortest distance from any point on the first circular-arc structure to the second circular-arc structure along a direction substantially parallel to the second' axial direction, and the first gap is greater than the second gap.

12. The backlight module of claim 9, wherein the light guide plate has a first axial direction and a second axial direction, and a center of the first circular-arc structure and a center of the second circular-arc structure are located on an axis substantially parallel to the first axial direction.

13. The backlight module of claim 9, wherein the frame further comprises a surface and a sidewall connected to the surface, the light guide plate is deposed on the surface and the second circular-arc structure is disposed on the sidewall.

14. The backlight module of claim 9, wherein the first circular-arc structure is a flange lug, and the second circular-arc structure is a recess portion.

15. The backlight module of claim 9, wherein the frame is a U-shaped structure and comprises an opening.

16. The backlight module of claim 15, wherein the first circular-arc structure and the second circular-arc structure are disposed adjacent to the opening.

17. The backlight module of claim 16, wherein the light source is disposed in the opening of the frame.

18. The backlight module of claim 15, wherein the light source is disposed in the opening of the frame.

19. A liquid crystal display, comprising:
an optical assembly as claimed in claim 1;
a light source disposed on a side of the light guide plate; and
a liquid crystal panel disposed on the frame of the optical assembly.

20. The liquid crystal display of claim 19, wherein a connecting line between a center of the first circular-arc structure and a center of the second circular-arc structure is substantially vertical to the side of the light guide plate.

* * * * *